United States Patent

Yonei

Patent Number: 5,214,326
Date of Patent: May 25, 1993

[54] SPINDLE MOTOR WITH MAGNETIC SHIELD FOR MAGNETIC FLUID SEAL

[75] Inventor: Hiroyuki Yonei, Hikone, Japan

[73] Assignee: Nippon Densan Corporation, Kyoto, Japan

[21] Appl. No.: 753,820

[22] Filed: Sep. 3, 1991

[30] Foreign Application Priority Data

| Sep. 1, 1990 | [JP] | Japan | 2-231835 |
| Sep. 29, 1990 | [JP] | Japan | 2-262527 |
| Oct. 24, 1990 | [JP] | Japan | 2-286359 |

[51] Int. Cl.⁵ .............. H02K 7/00; G11B 17/08; G11B 5/016; G11B 17/02
[52] U.S. Cl. .................. 310/67 R; 310/90; 360/98.08; 360/99.05
[58] Field of Search .............. 310/67 R, 90, 256; 384/133, 478; 277/80 R; 360/99.05, 99.12, 98.08

[56] References Cited

U.S. PATENT DOCUMENTS

| 4,694,213 | 9/1987 | Gowda et al. | 310/90 |
| 4,843,500 | 6/1989 | Elsasser et al. | 310/156 |
| 4,907,897 | 3/1990 | Shirotori | 384/478 |
| 5,001,581 | 3/1991 | Elsasser et al. | 360/99.08 |
| 5,009,436 | 4/1991 | Endo et al. | 277/80 |
| 5,011,165 | 4/1991 | Cap | 384/133 |
| 5,047,677 | 9/1991 | Mineta et al. | 310/67 R |
| 5,061,868 | 10/1991 | Iwazaki et al. | 310/67 R |

FOREIGN PATENT DOCUMENTS 0168835 6/1990 Japan ........................ 310/90

Primary Examiner—Steven L. Stephan
Assistant Examiner—C. LaBalle
Attorney, Agent, or Firm—McCormick, Paulding & Huber

[57] ABSTRACT

A magnetic disk drive device has a spindle motor for rotatingly driving magnetic disks in a predetermined direction, and a clamp member for mounting the disks on the spindle motor. The spindle motor has a hub rotatably supported through bearings and having a portion for mounting the magnetic disks, a rotor magnet carried by the hub, a stator disposed to oppose the rotor magnet, and magnetic fluid seal arrangement for preventing scattering of lubricant from the bearing means. The magnetic disk drive device further has a magnetic shield on the radially outer side of the magnetic fluid seal arrangement. One of the bearings rotatably supporting the hub may be charged with a lubricant having a comparatively low viscosity, while the other bearing may be charged with a lubricant having a comparatively high viscosity.

2 Claims, 4 Drawing Sheets

SPINDLE MOTOR WITH MAGNETIC SHIELD FOR MAGNETIC FLUID SEAL

BACKGROUND OF THE INVENTION

1. Field of the Invention

The present invention relates to a magnetic disk drive device for rotatingly driving a magnetic disk and a spindle motor for use in the magnetic disk drive device.

2. Description of the Related Arts

In general, a magnetic disk drive device has a spindle motor for rotatingly driving a magnetic disk in a predetermined direction and a clamp member for securing the magnetic disk to the spindle motor. The spindle motor has a hub which is rotatably supported through a bearing, a rotor magnet mounted on the hub, and a stator disposed so as to oppose the rotor magnet. The magnetic disk is secured to the hub by the clamp member.

The spindle motor used in such a magnetic disk drive device is provided with a suitable sealing means such as a magnetic fluid seal for preventing grease from coming into the space receiving the magnetic disk. The magnetic fluid seal has an annular permanent magnet and pole pieces which are mounted on both end surfaces of the permanent magnet. A magnetic fluid is charged in the ends of the pole pieces.

In known magnetic disk drive device which employs a magnetic fluid seal, however, encounters with a problem in that magnetic fluxes from the permanent magnet leaks into the space receiving the disk, causing errors in reading and writing information. This problem caused by leakage of magnetic fluxes from the magnetic fluid seal is becoming more serious when considered under the current trends for reduction in the size of the magnetic disk drive device and greater storage capacity of the magnetic disks.

Another problem encountered with the known magnetic disk drive device resides in that a loss of driving torque is increased when a lubricant of a comparatively large viscosity is used in a pair of ball bearings supporting the rotational part of the spindle motor, requiring a greater driving electric current to be supplied to the spindle motor. This problem would be obviated by the use of a lubricant having a comparatively small viscosity. Such a lubricant having a small viscosity, however, exhibits a greater tendency of scattering and, hence, a greater tendency of invasion of the space where the disk is disposed.

Furthermore, the known magnetic disk drive device requires a complicated assembly process due to difficulty encountered in correctly locating the pair of bearings at predetermined positions and at a predetermined spacing from each other.

SUMMARY OF THE INVENTION

A first object of the present invention is to provide a magnetic disk drive device which is improved to reduce leakage of magnetic fluxes from a magnetic fluid seal incorporated in the device.

A second embodiment of the present invention is to provide a spindle motor for use in a magnetic disk drive device, improved to effectively prevent invasion of the disk space by a lubricant while suppressing any increase in the loss of torque.

A third object of the present invention is to provide a spindle motor for use in a magnetic disk drive device, improved to facilitate the assembly particularly in regard to the setting of bearings.

The above and other objects, features and advantages of the present invention will become clear from the following description when the same is read in conjunction with the accompanying drawings.

DESCRIPTION OF THE PREFERRED EMBODIMENTS

The invention will be more fully described with reference to the drawings.

Magnetic Disk Drive Device

A first embodiment of the magnetic disk drive device of the present invention will be described with reference to FIG. 1.

Figure 1:
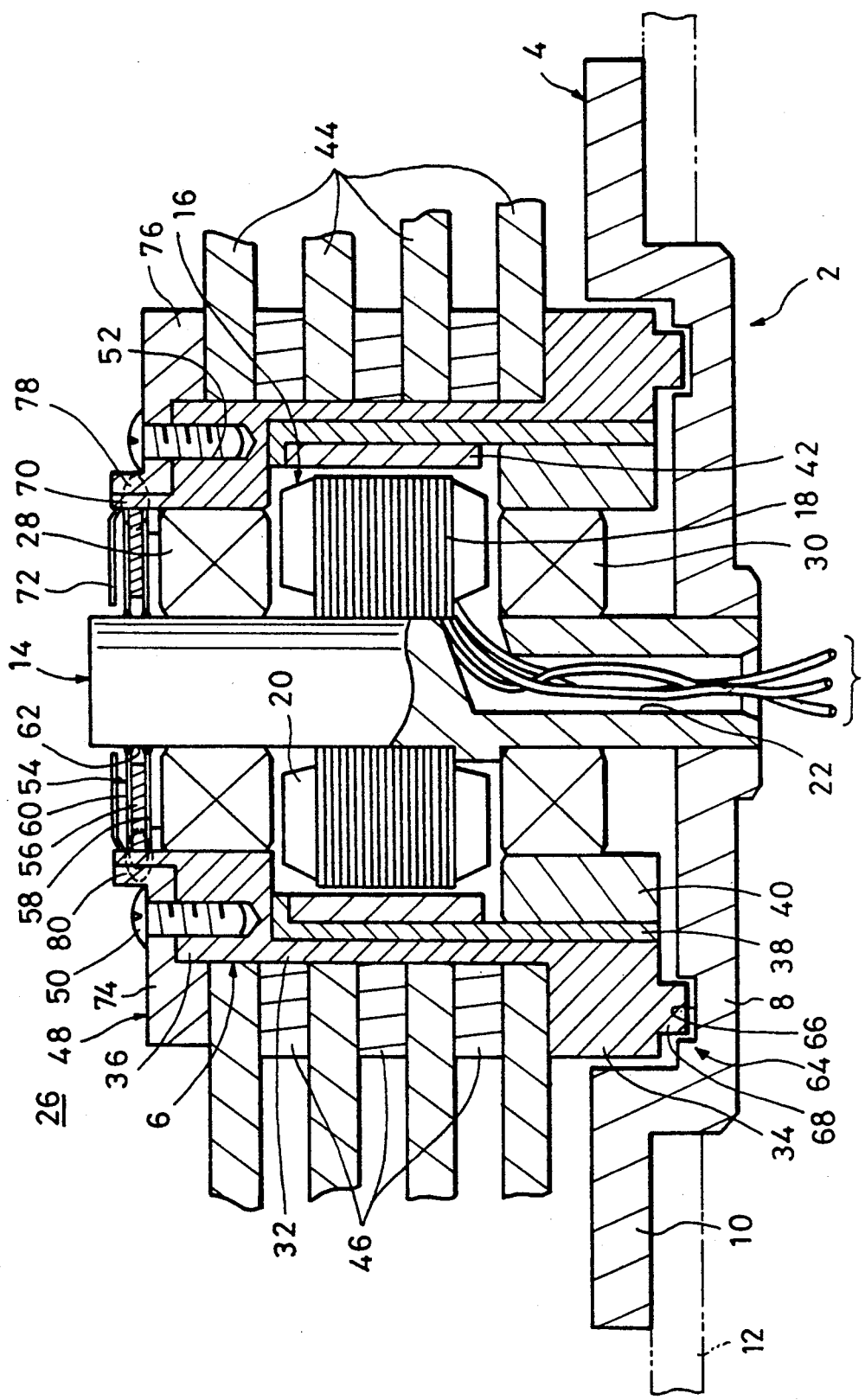
FIG. 1 is a sectional view of a portion of a first embodiment of the magnetic disk drive device in accordance with the present invention.

Referring to FIG. 1, the first embodiment of the magnetic disk drive device of the present invention has a spindle motor generally denoted by 2. The spindle motor 2 has a substantially disk-shaped bracket 4 and a hub 6 which is rotatable relative to the bracket 4. The bracket 4 has a substantially circular bracket member 8 is provided at its peripheral portion with a flange 10 which extends radially outward therefrom. The bracket 4 is fixed at a predetermined position as the flange 10 is secured by screws (not shown) to a base plate 12 of the magnetic disk drive device.

A shaft member 14 is fixed to the center of the bracket 6. The shaft member 14 maybe formed from, for example, a ferromagnetic material such as a carbon steel. The shaft member 14 is press-fitted at its lower end to a hole formed in the bracket member 4. A stator 16 is secured to the center of the shaft member 14. The stator 16 has a stator core 18 which is formed of a laminate of plates and an armature coil 20 which is wound on the stator core 18 in a predetermined fashion.

The shaft member 14 is provided with an axial through hole 22 through which lead wires 24 from the armature coil 20 are led to the exterior of the bracket 4, i.e., to the exterior of a disk chamber 26.

Bearing members 28 and 30 are provided on both ends of the shaft member 14. The hub 6 is rotatably supported through the intermediaries of these shafts 28 and 30. The hub 6 has a cylindrical hub member 32 one end (lower end in the illustrated embodiment) of which is provided with a flange 34 which extends radially outward therefrom. An end wall 36 is provided on the other end (upper end) of the hub member 32. The hub 6 may be formed from aluminum and its upper end rotatably supports the end wall 36 through the bearing 28, while the lower end of the hub 6 is rotatably supported through a later-mentioned yoke member 38, an annular bush 40 and the above-mentioned bearing member 30.

The yoke member 38, which has a ring-like form, is mounted on the inner peripheral surface of the hub member 32. A rotor magnet 42 is mounted on the upper end portion of the inner peripheral surface of the yoke member 38.

The rotor magnet 42 is disposed so as to oppose the stator 16 which is fixed to the bearing member 14. The hub 6 is rotatingly driven by the interaction between the rotor magnet 42 and the stator 16.

A stack of a plurality of magnetic disks 44, four disks in the illustrated embodiment, is mounted on the outer surface of the hub 6. These disks 44 are integrally fixed to the hub 6 by means of a clamp member 48 which is fastened to the hub 6 by means of screws 50 screwed into threaded holes 52 in the hub 6.

A detailed description of the clamp member 48 and associated parts will be given later.

A magnetic fluid seal 54 is provided on the outer side of one 28 of the bearing members. The magnetic fluid seal 54 has a magnetic circuit unit and a magnetic fluid 62. The magnetic circuit unit includes a doughnut-shaped magnet 56 and ferromagnetic pole pieces 58, 60 between which the magnet 56 is located. The doughnut-shaped magnet 56 is magnetized such that N and S poles, for example, appear on both axial ends thereof, so as to act on the ends of the pole pieces 60, 62, whereby the magnetic fluid 62 is held in the gaps between the ends of the pole pieces 60, 62 and the shaft member 14. The magnetic fluid seal layers formed between the pole pieces 60, 62 and the shaft member 14 provide a partition between the bearing member 28 and the disk chamber 26 accommodating the magnetic disks 44, thereby preventing lubricant in the bearing member 28 and contaminant air stagnant in the hub 6 from flowing and scattering into the disk chamber 26.

A labyrinth-type seal mechanism 64 is provided on the outer side of the other bearing member 30, i.e., in the space between the bearing member 30 and the wall of the disk chamber 26. The labyrinth-type seal mechanism 64 is composed of annular recesses 66 formed in the bracket member 8 and mating annular projections 68 provided on the lower end surface of the flange 34 of the hub 6.

In the illustrated embodiment, an annular wall 70 projects axially outward from the end wall 36 of the hub 6. The above-mentioned magnetic circuit unit 54 is mounted on the inner peripheral surface of this annular wall 70. A cap 72 is disposed on the outer side of the magnetic circuit unit 54. The outer peripheral edge of the cap 72 fits on the inner peripheral surface of the annular wall 70. The clamp member 48 has a disk-shaped clamper 74 which is provided at its outer peripheral edge with a clamping portion 76 which acts on the magnetic disk 44. The clamper 74 also is provided on the inner peripheral edge thereof with an annular shield member 78 which extends in the direction opposite to the clamping portion 76, i.e., radially outward. The clamp member 48 is made of a ferromagnetic material.

The clamp member having the described construction is mounted on the hub 6 in a manner shown in FIG. 1. In this state, the annular shield portion 78 is located at the radially outer side of the annular wall 70 on the hub 6 so as to surround the entire periphery of the same. As a consequence, the magnetic fluxes 80 from the magnetic circuit unit 54 permeate through the annular wall 70 on the hub 6 and are converged on the annular shield portion 78 of the clamp member 48.

Consequently, the magnetic fluxes are prevented from radially diverging beyond the annular shield portion 78 into the region where the disks 44 are disposed. It is therefore possible to prevent formation of a magnetic field by leaking magnetic fluxes B in the space where a magnetic head (not shown) operates, thus eliminating any undesirable effect of the leaking magnetic fluxes B on the reading/writing characteristics of the magnetic head. The annular shield portion 78 also functions as a guide for the clamp member 48 when the later is mounted on the hub 6, whereby the centering of the clamp member 48 is facilitated.

Figure 2:
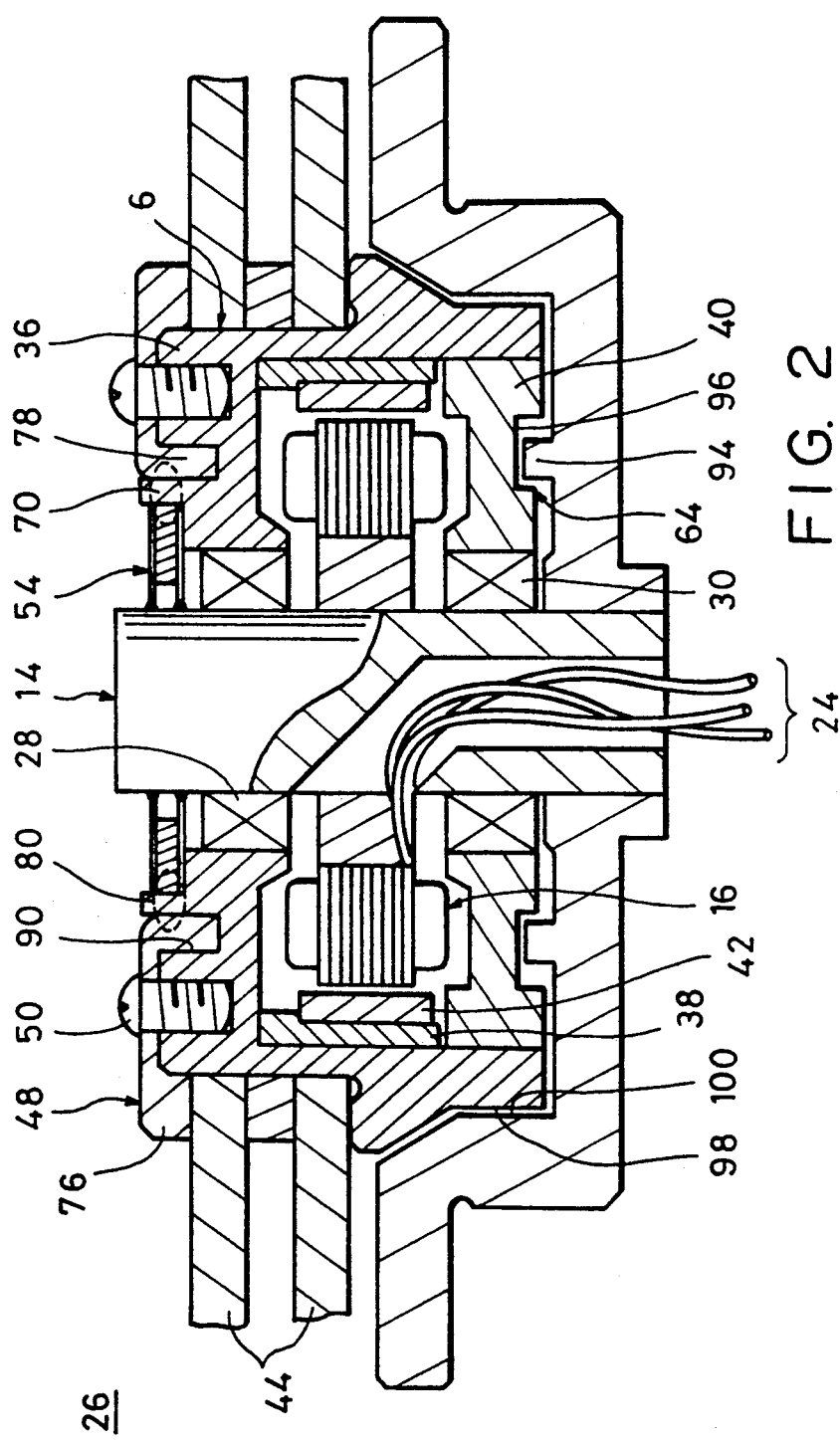
FIG. 2 is a sectional view of a portion of a second embodiment of the magnetic disk drive device in accordance with the present invention.

FIG. 2 shows a second embodiment of the magnetic disk drive device of the present invention. For the purpose of an easier understanding, the same reference numerals are used in FIG. 2 to denote the same parts or members as those in the first embodiment.

The hub 6 is made from aluminum or an aluminum alloy and is rotatably supported by the shaft member 14 through bearing members 28 and 30. The hub 6 has an end wall 36 on the inner peripheral portion of which is formed wall 70 which projects axially outward. The end wall 36 is provided with an annular recess 90 formed in a portion thereof which is on the radially outer side of the wall 70. The annular recess 90 extends axially inward.

The clamp member 48 is made of, for example, a ferromagnetic material such as an electromagnetic steel sheet, and is provided on the outer peripheral end thereof with a clamping portion 76a which acts on the magnetic disk 44. The clamp member 48 also is provided on the inner peripheral end thereof with an annular shield portion 35 for magnetically shielding magnetic fluxes as will be described later. The clamp member 48 is mounted to the hub 6 by means of screws 50 which are driven into threaded holes in the hub 6 through holes formed in the clamp member 48, whereby the magnetic disks 44 are fastened to the hub 6 in a predetermined manner, as shown in FIG. 2. In this state, the annular shield portion 78 is located within an annular recess 90 provided in the portion of the hub 6 around the wall 70, so as to produce the following effect.

Magnetic fluxes 80 from the magnetic circuit unit of the magnetic fluid seal 54 permeate through the wall 70 so as to be converted in a magnetic circuit which is formed by the annular shield portion 78 which serves as a magnetic seal. As a consequence, the magnetic fluxes are materially prevented from reaching the disks 44, whereby the same advantages that produced by the first embodiment can be attained. The annular shield portion 78 extends inward in the direction of axis of the hub 6, so that the height of the hub 6 can be appreciably reduced as compared with the first embodiment and the effective lengths of the threaded holes in the hub member 6 can be substantially increased for the screws 50.

The second embodiment also has a labyrinth-type seal mechanism which is composed of annular projections 94 formed on the inner peripheral surface of the bracket member 8 and mating annular recesses 96 formed on the outer (lower) surface of the bush 40 over the entire periphery of the latter. In addition, the lower surface 98 of the flange of the hub 6 is disposed in the close proximity of the inner surface 100 of the bracket 4 so as to form a seal which effectively prevents oil mist or other contaminants in the bearing member 30 from coming into the disk chamber 26.

In the embodiments shown in FIGS. 1 and 2, the annular shield portion 78 of the clamp member 48 materially shields the magnetic fluxes 80 from the magnetic circuit unit, so that it suffices only to use a ferromagnetic material at least for the annular shield portion 80. The clamp member 48 and the annular shield portion 80 can have any desired configurations, provided that such configurations do not hamper the described advantages of the present invention.

It is also possible to form an annular magnetic shield member separate from the clamp member 48 and to fit it is the annular recess 90 formed in the hub 6.

The second embodiment also incorporates the following features concerning the pair of bearing members 28, 30.

In the second embodiment, the upper bearing 28 is a ball-type bearing. Since the magnetic fluid seal 54 is disposed in the vicinity of this bearing 28, the viscosity of the lubricant charged in this bearing is comparatively low. More specifically, the lubricant used in this bearing 28 preferably has a viscosity level ranging between 10 and 30 cst at 40° C. For instance, a lubricant available under a commercial name MULTEMP SRL from Kyodo Yushi Kabushiki kaisha, as well as a lubricant sold as ISOFLEX SUPER LDS 18 from KLUBEWR LUBRICATION MUNCHEN KG, can be used suitably. The lower viscosity of the lubricant used, the greater the tendency for scattering of the lubricant and formation of oil mist. In the second embodiment, however, the risk for the disk chamber 26 to be invaded by such an oil mist can be eliminated by virtue of the presence of the magnetic fluid seal 54 which effectively prevents the oil mist from coming into the disk chamber 26.

Thus, the magnetic fluid seal affords a greater allowance for the viscosity of the lubricant to be used in the upper bearing member 28, permitting the use of a lubricant which would minimize the friction and, hence, loss of torque.

The lower bearing 30 also is of the ball type. A lubricant having a comparatively high viscosity is charged in this bearing 30 because the seal mechanism 64 provided in the vicinity thereof is of labyrinth type. More specifically, the viscosity of the lubricant used in this bearing has a viscosity level ranging from 80 to 110 cst at 40° C. A lubricant sold under commercial name of ANDOC C from Esso Standard Oil can suitably be used as the lubricant for the bearing 30. The labyrinth-type seal mechanism allows a slightly flow of air through the minute gap between the annular projections 94 and the annular recesses 96, so that any mist of lubricant suspended by the air may pass through this seal mechanism together with the air. In order to minimize such leak of lubricant mist, it is necessary to use a lubricant having a comparatively large viscosity in the bearing 30. The use of such a viscous lubricant suppressed scattering of the lubricant and enhances the effect of the labyrinth seal.

Thus, in the second embodiment of the magnetic disk drive device of the present invention, a magnetic fluid seal 54 is used in combination with the bearing 28 which is charged with a comparatively less-viscous lubricant, while a labyrinth-type seal mechanism 64 is used in combination with the bearing 30 which is charged with comparatively viscous lubricant.

Although in the described second embodiment the magnetic fluid seal 54 is disposed on the upper side of the hub 6 while the labyrinth-type seal mechanism 64 is disposed at the lower end of the hub 6, this is only illustrative and the arrangement may be reversed such that the upper bearing 28 is charged with a comparatively viscous lubricant to enable the use of a labyrinth-type seal mechanism at the upper side of the hub 6, while the lower bearing 30 is charged with a comparatively less-viscous lubricant for cooperation with the a magnetic fluid seal used as the lower sealing means.

SPINDLE MOTOR

Figure 3:
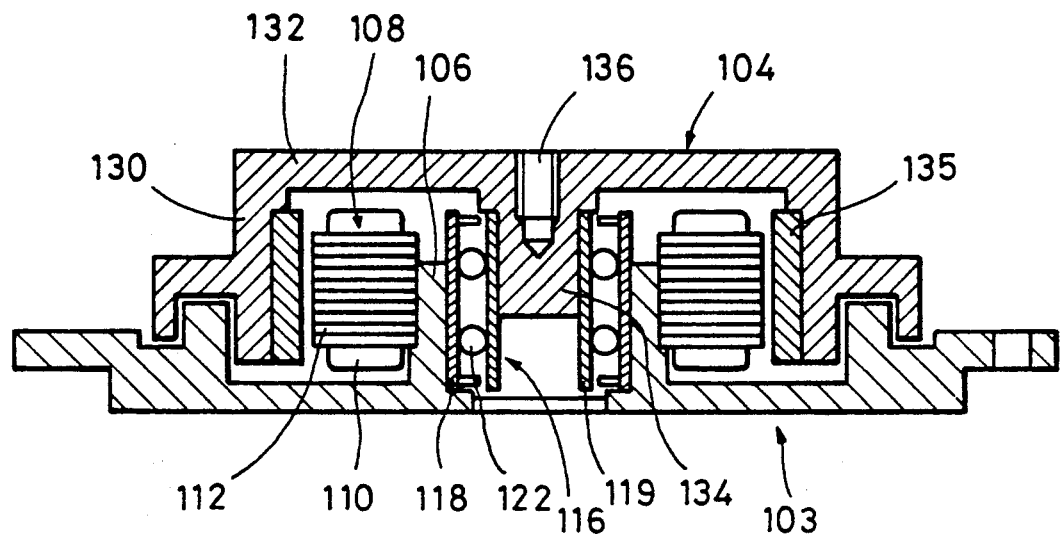
FIG. 3 is a sectional view of a first embodiment of the spindle motor in accordance with the present invention.
Figure 4:
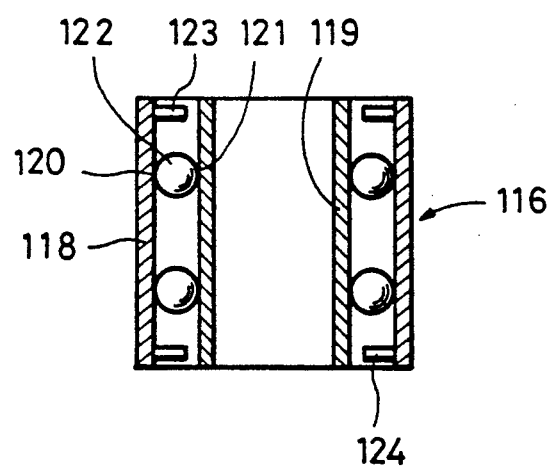
FIG. 4 is an enlarged sectional view of the spindle motor shown in FIG. 3, illustrating particularly bearing means incorporated in the spindle motor.

FIGS. 3 and 4 show an embodiment of the spindle motor of the present invention suitable for use in the magnetic disk drive device of the present invention.

The spindle motor shown in these Figures has a bracket member 103 and a hub 104. The bracket member 103 is provided with a circular hole formed substantially at the center thereof. A hollow cylindrical wall 106 protrudes from the inner peripheral edge defining this circular hole, and a stator 108 is mounted on the outer peripheral surface of this cylindrical wall 106. The stator 108 includes a stator core 112 fixed to the cylindrical wall 106 and a coil 110 wound on the stator core 112.

The bracket member 103 mounts a bearing means 116 which will be detailed later.

The hub 104 is an integral member having a cylindrical portion 130, an end wall 132 on the top of the cylindrical portion 130 and a shaft portion 134 on the center of the end wall 132. The shaft portion 134 is provided with a threaded clamp hole 136 into which a screw (not shown) is driven to fasten a clamp member (not shown), whereby recording disks such as magnetic disks are secured to the hub 104.

The cylindrical portion 130 of the hub 104 covers the stator 108 which is mounted on the cylindrical wall 106 of the bracket member 103, and a rotor magnet 135 is fitted on the inner peripheral surface of the cylindrical portion 130. The arrangement is such that the hub 104 and, hence, the recording disks (not shown) mounted thereon are rotatingly driven in a predetermined direction due to an interaction between the rotor magnet 135 and the stator 108.

FIG. 4 is a sectional view of the bearing means 116. The illustrated bearing means 116 has a hollow cylindrical outer race (bearing sleeve) 118, and an inner race 119 disposed inside the outer race 118. Pairs of annular grooves 120, 121 are formed in the inner peripheral surface of the outer race 118 and the outer peripheral surface of the inner race 119, such that a plurality of ball passages, upper and lower ball passages in the illustrated case, are defined by the opposing annular grooves. These passages are charged with a plurality of balls 122 which can roll and run along the annular grooves 120, 121. Thus, the outer race 118 and the inner race 119 are rotatable relative to each other through the action of the balls 122. The axial spacing between the annular grooves 120 in the outer race 118 and the axial spacing between the annular grooves 121 in the inner race 119 are slightly different from each other so that the balls charged between the outer and inner races 118, 119 are suitably pre-loaded to exclude any play or rattle during the operation.

An annular seal member 123 is fixed to the upper end of the outer race 118. This seal member 123 has an inside diameter slightly smaller than the outside diameter of the inner race 119, so that the inner race 119 does never contact with the seal member 123 during rotation relative to the outer race 118. An annular seal member 124 is fixed to the lower end of the outer race 118. This seal member 124 also has an inside diameter slightly smaller than the outside diameter of the inner race 119 so that it is never contacted by the inner race 119 when the latter rotates relative to the outer race 118. These seal members 123, 124 effectively prevent grease or other particles from scattering outside.

This bearing means 116 can be fabricated as a unit independently of other components of the spindle motor and can easily be mounted in the spindle motor.

Referring again to FIG. 3, the outer race 118 of the bearing means 116 is fixed to the hollow cylindrical wall 106 of the bracket member 103 by bonding, press-fitting or other suitable means. On the other hand, the inner race 119 of the bearing means 116 is fixed to the shaft portion 134 of the hub 104 by bonding, press-fitting or other suitable means as is the case of the outer race 118.

The spindle motor having the described construction can be assembled by the following method. The bearing means 116 as a unit as shown in FIG. 4 is fabricated and assembled beforehand. The bearing means 116 is then fixed by bonding, press-fitting or other suitable measure to the bracket member 103 on which components such as the stator 108 have been mounted. Subsequently, the shaft portion 134 of the hub member 104 is bonded, press-fitted or likewise fixed to the bearing means 116. It is thus possible to easily assemble the spindle motor. In addition, a high assembly precision is attained by virtue of the fact that the shaft member 134 is integrally formed on the hub 104.

Figure 5:
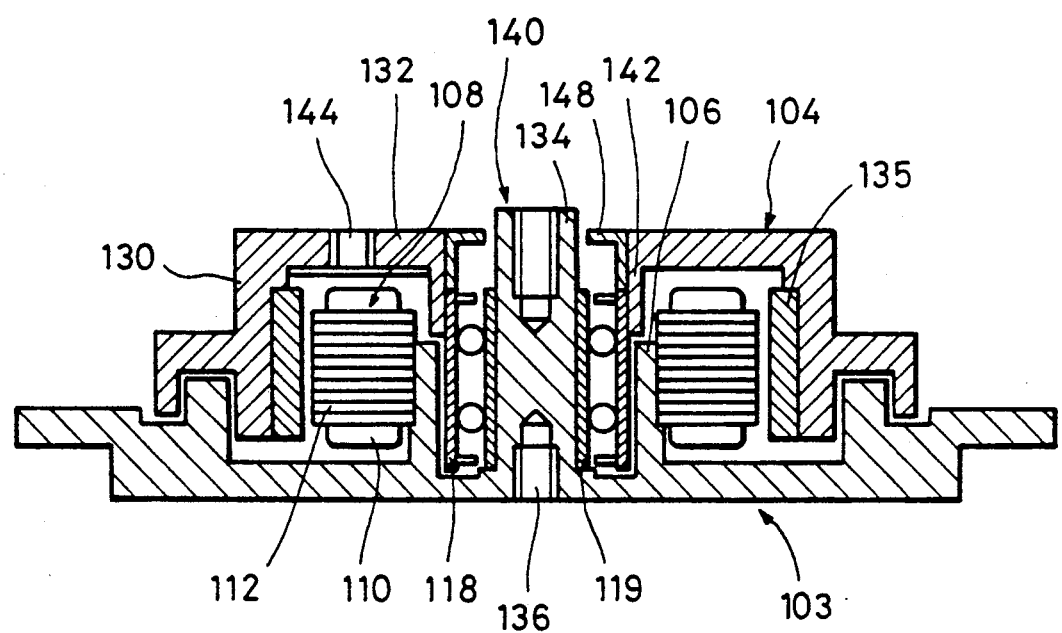
FIG. 5 is a sectional view of a second embodiment of the spindle motor in accordance with the present invention.

In the embodiment shown in FIGS. 3 and 4, the outer race 18 and the inner race 119 of the bearing means 116 are respectively fixed to the bracket member 102 and the hub 104. This, however, is not exclusive and the arrangement may be such that the outer race 118 and the inner race 119 of the bearing means 116 are respectively fixed to the hub 104 and the bracket member 103, as in the case of a modification shown in FIG. 5. In FIG. 5, the same reference numerals are used to denote the same parts or components as those appearing in FIGS. 3 and 4, and detailed description of such parts or members is omitted.

Referring to FIG. 5, the bracket member 102 is provided with a shaft portion 134 projecting from substantially central portion thereof. The shaft portion 134 is fixed to the inner race 119 of the bearing means 116. A stator 108 is mounted on the outer peripheral surface of the cylindrical wall 106. The bearing means 116 may be of the same type as that shown in FIG. 2.

On the other hand, the hub 104 is provided with a central hole 140 and a cylindrical wall 142 around the central hole 140. Numeral 144 denotes a clamp hole. The cylindrical wall 142 is fixed to the outer race 118 of the bearing means 116.

According to the arrangement shown in FIG. 5, a high precision of assembly is ensured by virtue of the fact that the shaft portion 134 is formed integrally with the bracket member 103.

The hole 140 may be covered by a seal member when the height of the shaft portion 134 is small.

In the arrangement shown in FIG. 5, a labyrinth-type seal mechanism is disposed outside the bearing means 116. More specifically, a cap 148 is mounted on the inner peripheral surface of the cylindrical wall 142 of the hub 104 such that it cooperates with the shaft portion 140 in forming a seal which effectively contributes to prevention of invasion of the disk chamber by the lubricant.

What is claimed is:

1. A magnetic disk drive device, comprising:
a spindle motor for rotatingly driving magnetic disks in a predetermined direction, said spindle motor including a hub rotatably supported through bearing means and having a portion for mounting said magnetic disks, a rotor magnet carried by said hub, a stator arranged to oppose and cooperate with said rotor magnet, and magnetic fluid seal means for preventing scattering of lubricant from said bearing means; and clamp means for securing said magnetic disks to said hub of said spindle motor; wherein said hub has an end wall which is provided in the outer surface thereof with an annular recess at a portion corresponding to the position of said magnetic fluid seal means, and said clamp means is provided with an annular shield portion disposed in said annular recess and forming a shield against magnetic fluxes from said magnetic fluid seal means.

2. A magnetic disk drive device, comprising:
a spindle motor for rotatingly driving magnetic disks in a predetermined direction, said spindle motor including a hub rotatably supported through bearing means and having a portion for mounting said magnetic disks, a rotor magnet carried by said hub, a stator arranged to oppose and cooperate with said magnet, and magnetic fluid seal means for preventing scattering of lubricant from said bearing means and clamp means for securing said magnetic disks to said hub of said spindle motor; wherein said hub has an end wall provided with an axially projecting wall formed at a portion thereof corresponding to the position of said magnetic fluid seal means, and said clamp means is provided with an annular shield portion disposed on the radially outer side of said projecting wall and forming a shield against magnetic fluxes from said magnetic fluid seal means.

* * * * *